United States Patent [19]

Carver

[11] Patent Number: 6,121,979
[45] Date of Patent: Sep. 19, 2000

[54] CONTROLLERS FOR MODIFYING SHAPES BASED ON A CONTROL LINE PLACED AT AN ARBITRARY ANGLE

[75] Inventor: Brett K. Carver, Santa Rosa, Calif.

[73] Assignee: Agilent Technologies, Inc., Palo Alto, Calif.

[21] Appl. No.: 09/067,709

[22] Filed: Apr. 28, 1998

[51] Int. Cl.$^7$ .................................................. G06F 15/00
[52] U.S. Cl. ............................................................. 345/438
[58] Field of Search .................................... 345/418, 419, 345/429, 433, 438, 441, 118, 121

[56] References Cited

U.S. PATENT DOCUMENTS

| | | | |
|---|---|---|---|
| 5,861,889 | 1/1999 | Wallace et al. | 345/438 |
| 5,982,382 | 11/1999 | Benzel | 345/438 |

OTHER PUBLICATIONS

Virtuoso™ Parameterized Cell Reference Manual, Version 4.2.1, Sep. 1992, Cadence, 555 River Oaks Parkway, San Jose, CA 95134–1917, i through x and 1–1 through 1–11.

*Primary Examiner*—Phu K. Nguyen

[57] ABSTRACT

A stretch controller and a repeat controller allow for manipulation of graphical shapes in arbitrary angles. To stretch the graphic shape, a stretch distance and a stretch direction are received from a user. When the stretch direction is positive, then a determination is made as to vertices of the graphic shape are on a first side of a control line. The control line is at an arbitrary angle. This means that the control line does not have to be parallel to or orthogonal to an x-axis, but can be placed at a range of angles from 0 degrees to 180 degrees with respect to the x-axis. The vertices of the graphic shape, which are on the first side of the control line are moved the stretch distance in a direction orthogonal to the control line.

25 Claims, 14 Drawing Sheets

CONTROLLERS FOR MODIFYING SHAPES BASED ON A CONTROL LINE PLACED AT AN ARBITRARY ANGLE

BACKGROUND

The present invention concerns generation of graphics using a computing system and pertains particularly to controllers for modifying shapes based on a control line placed at an arbitrary angle.

Computer Aided Engineering (CAE) software is used for a variety of purposes. For example, electrical engineers often use CAE software to design circuits.

When using CAE software, a productivity engineer or a circuit designer may discover that artwork desirable for a particular project is not included with the CAE software. In order to generate the desired artwork, it is then necessary to modify an existing artwork macro or create a new artwork macro. Alternatively, an internal macro language such as the Application Extension Language (AEL) may be used to generate an appropriate macro.

Programming in an internal macro language such as the Application Extension Language (AEL) can require a significant amount of expertise. Therefore, various attempts have been made to make it easier for a designer to generate a library of useful variable graphics which can be used for a variety of purposes.

For example, the Virtuoso™ Parameterized Cell Reference Manual, Version 4.2.1, September 1992, available from Cadence, having a business address of 555 River Oaks Parkway, San Jose, Calif. 95134-1917, describes a product which uses parameterized cells as graphic, programmable cells which can be customized. Each parameterized cell includes a graphic layer and assigned parameters. Using the parameterized cell, instances can be created in which parts of the parameterized cell may be repeated or stretched.

While products exist to allow some generation of parameterized cells, the types of shapes that can be produced simply and efficiently are limited. For example, there is no straightforward way to perform various modifications to shapes based at arbitrary angles. The present invention solves this lack in the prior art.

SUMMARY OF THE INVENTION

In accordance with the preferred embodiment of the present invention, a graphic shape is manipulated. To stretch the graphic shape, a stretch distance and a stretch direction are received from a user. When the stretch direction is positive, then a determination is made as to which vertices of the graphic shape are on a first side of a control line. The control line is at an arbitrary angle. This means that the control line does not have to be parallel to or orthogonal to an x-axis, but can be placed at a range of angles from 0 degrees to 180 degrees with respect to the x-axis. The vertices of the graphic shape, which are on the first side of the control line are moved the stretch distance in a direction orthogonal to the control line.

In the preferred embodiment, when the stretch direction is negative, then a determination is made as to which vertices of the graphic shape are on a second side of a control line. The vertices of the graphic shape, which are on the second side of the control line are moved the stretch distance in a direction orthogonal and away from the control line.

In the preferred embodiment, when the stretch direction is both positive and negative, then the vertices of the graphic shape, which are on the first side of the control line are moved one half the stretch distance in a direction orthogonal to the control line. Also, the vertices of the graphic shape, which are on the second side of the control line are moved one half the stretch distance in a direction orthogonal and away from the control line.

When all vertices of the graphic shape are on the first side of the control line, and the direction is positive, all the vertices of the graphic shape are moved the stretch distance in the direction orthogonal to the control line.

In this case the stretch acts similar to a move of the graphic shape.

The graphic shape also can be repeated (i.e., copied). A number of repeated shapes to be generated is received from the user. Also, a repeat direction is received from the user. When the repeat direction is parallel, the repeated shapes are generated in a direction parallel to a control line.

The control line is at an arbitrary angle. When the repeat direction is perpendicular, the repeated shapes are generated in a direction perpendicular to the control line. When the repeat direction is both parallel and perpendicular, the repeated shapes are generated in a direction perpendicular to the control line and in a direction parallel to the control line creating an M×N grid of shapes.

Also, in the preferred embodiment, the user indicates a repeat distance which specifies a repeat distance between repeated shapes in the direction parallel to the control line. The user can also indicate a repeat distance which specifies a repeat distance between repeated shapes in the direction perpendicular to the control line.

The present invention allows for great flexibility in generating graphic shapes. For example, the present invention facilitates the versatile stretching and repeating of shapes. The present invention particularly contributes to the art in that the control line can be at an arbitrary angle. In the prior art, manipulations of shapes, such as repeat and stretch, were performed in directions parallel or orthogonal to the x-axis. There has been no provision to perform such manipulations using a control line that is at an arbitrary angle.

DESCRIPTION OF THE PREFERRED EMBODIMENT

Figure 1:
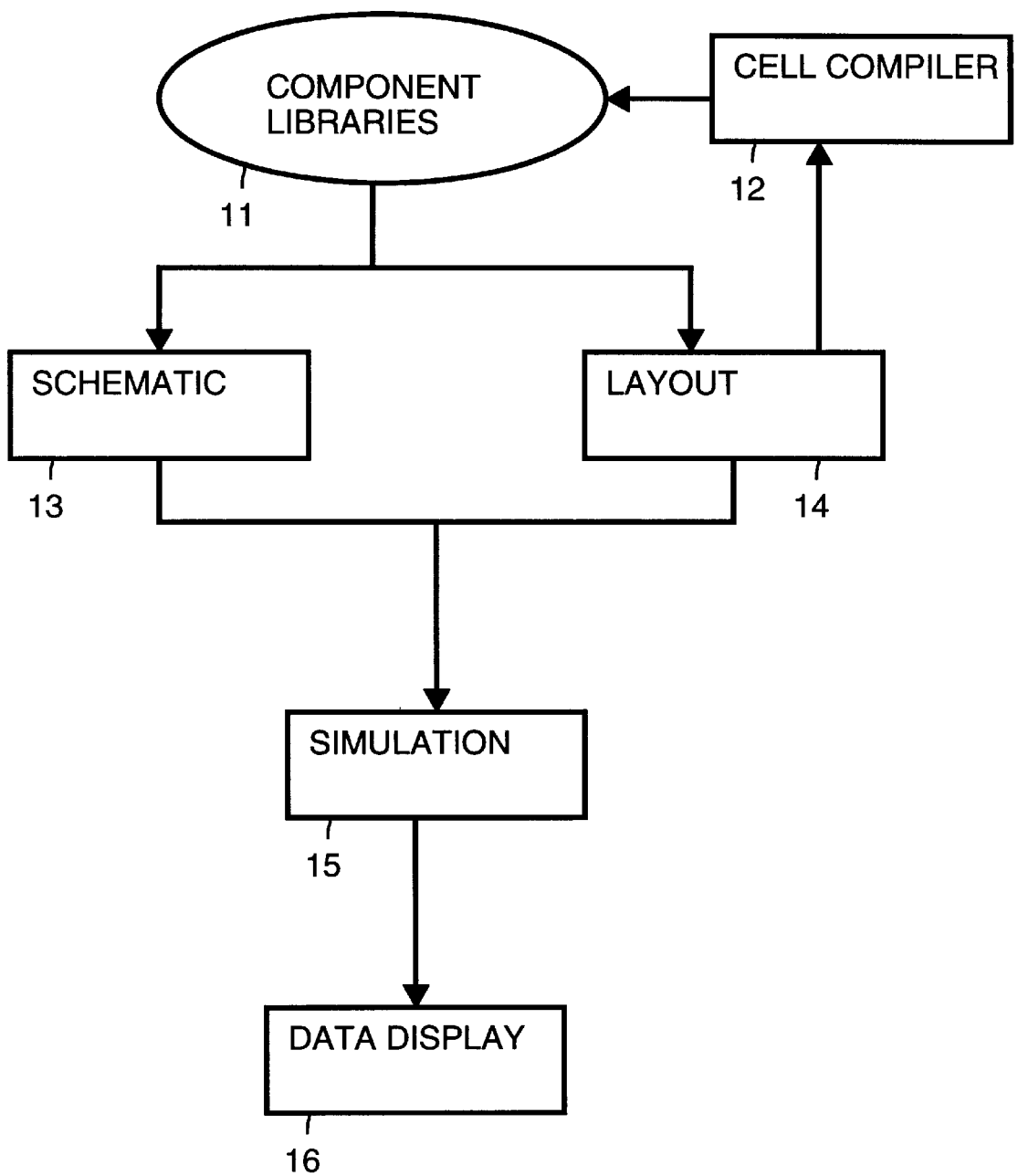
FIG. 1 is a simplified general overview flowchart which illustrates a design process using a graphical cell compiler and component libraries.

FIG. 1 is a simplified general overview flowchart which illustrates a design process using a graphical cell compiler 12 to generate entries in component libraries 11. A designer uses CAE software to work with a schematic 13 and a layout 14. When a circuit design is completed, and possibly during various stages of development, simulation 15 is performed and the results are shown in a data display 16.

When desired artwork is not supplied as part of the CAE software, graphical cell compiler 12 can be used to generate complex parameterized artwork macros (PAMS).

Figure 2:
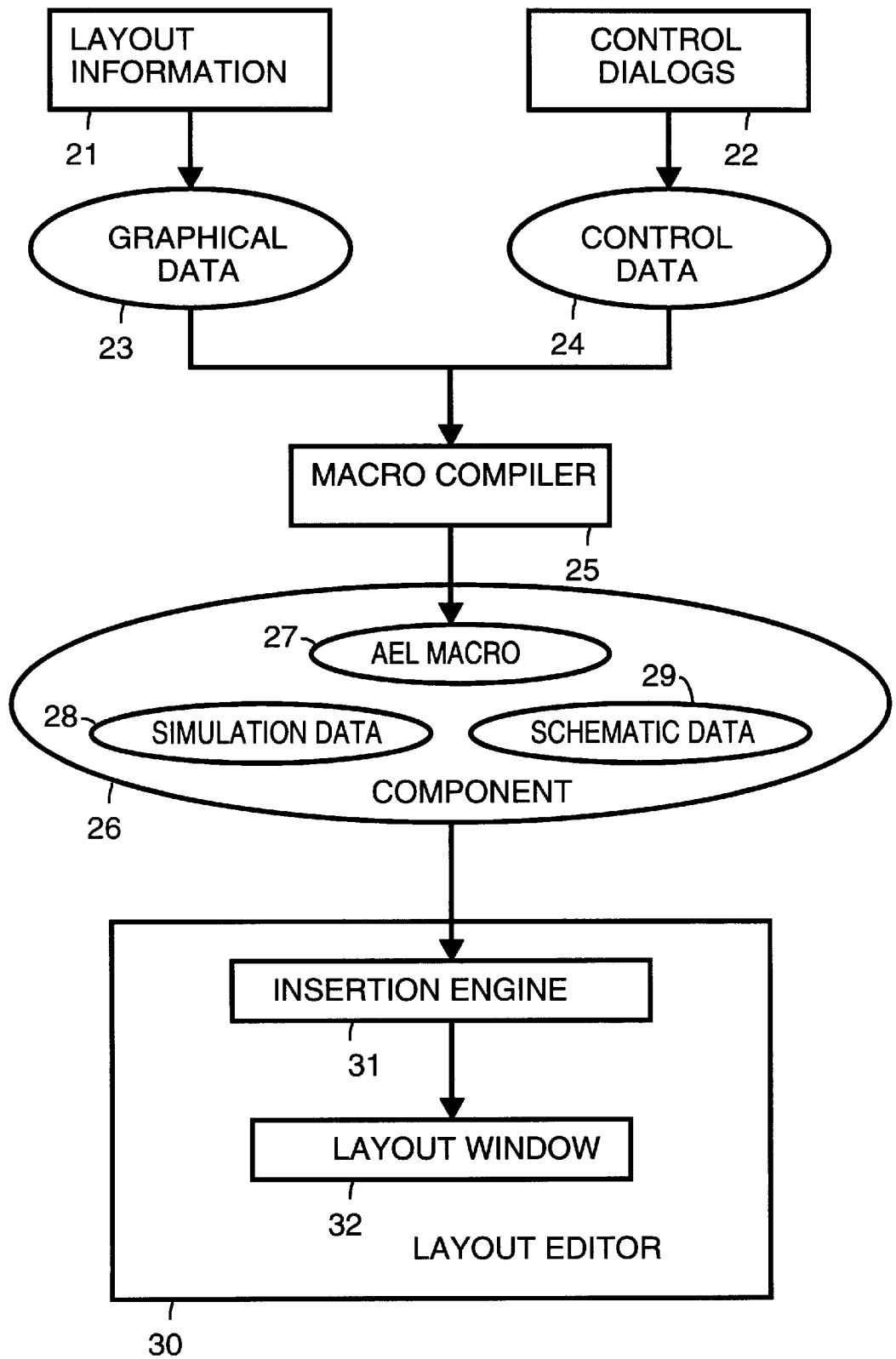
FIG. 2 is a flowchart which illustrates flow of control information and layout information through the graphical cell compiler shown in FIG. 1.

FIG. 2 is a flowchart which illustrates flow of control and data through graphical cell compiler 12. Layout information 21 is obtained a layout window 14 is the source of graphical data 23. Control dialogs 22 are dialog boxes which allow the user to enter the information which defines the operations on graphical data 23. The information is stored as control data 24.

A macro compiler 25 generates an Application Extension Language (AEL) macro 27 within a component 26. Component 26 is stored in components library 11. Within component 26, simulation data 28 and schematic data 29 are also included.

A layout editor 30 uses an insertion engine 31 to place component 26 inside a layout window 32.

In order to generate a PAM, a designer defines the artwork graphically in a Layout window (represented by layout information 21), typically using a layout editor. The designer then defines parameters to effect the artwork. Macro compiler 25 is used to compile the macro. The compiled macro 27 may then be stored as part of a component 26 within component libraries 11 (shown in FIG. 1) for later use by the designer. For storage within component libraries 11, default values are generally assigned to the parameters for the compiled macro. A designer may then utilize the macro in a current layout (represented by layout window 32). The designer edits the parameters as desired for each instance of the macro used.

Figure 3:
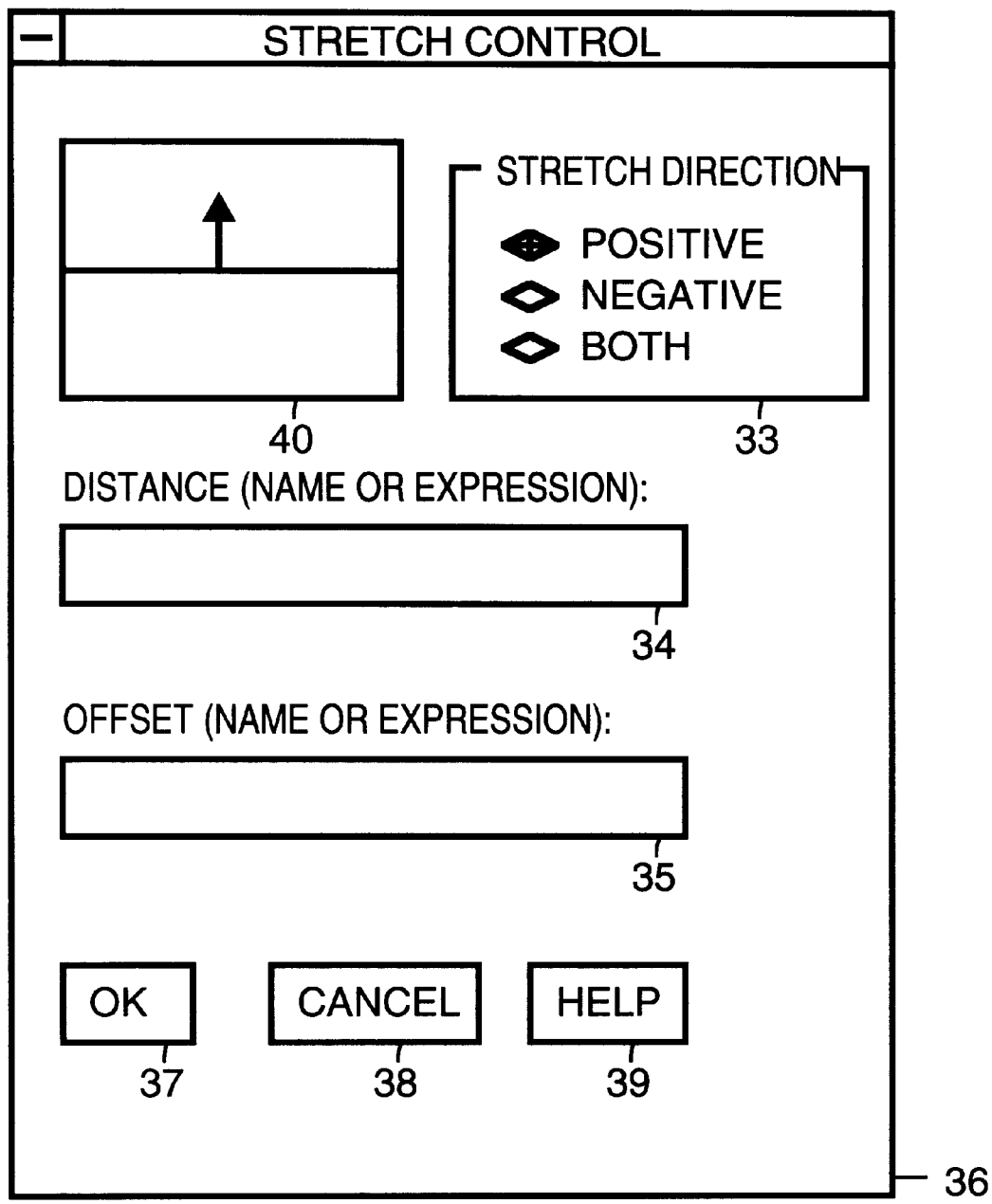
FIG. 3 is a dialog box for a stretch controller in accordance with a preferred embodiment of the present invention.

FIG. 3 shows a dialog box 36 used to receive, from a user, control data 24 used as input to a stretch controller. A user uses a box 33 to indicate whether the stretch direction is to be positive, negative or both positive and negative with respect to a control line. Box 40 graphically illustrates to a user the orientation of the control line and the direction selected in box 33.

In a box 34, a user enters distance of the stretch. The distance can be a constant, a variable whose value is supplied by the user at insertion time, or an equation made up of one or more variables and/or constants.

In a box 35, a user enters an offset for the stretch. The offset can be a constant, a variable whose value is supplied by the user at insertion time, or an equation made up of one or more variables and/or constants. Offset is the amount to subtract from the entered length to compensate for the original size of the shape. This makes it possible to create a parameterized artwork macro (PAM) using a shape with some size (so it is easier to work with), and use the PAM without needing to know its initial size. For example, if a PAM is created using a rectangle length 100 and an offset of 100, then when the PAM is used and a length of 50 is entered, a rectangle is produced which has a total length of 50 rather than 150.

When a user selects an OK button 37, all the values are entered into the system as control data 24. When the user selects a Cancel button 38, all the information just entered is discarded. A user can request help information by selecting a Help button 39.

Figure 4:
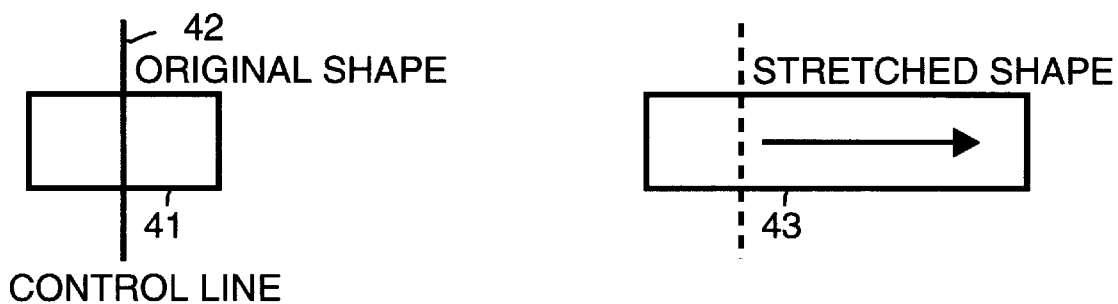
FIG. 4 illustrates stretching of an original shape based on a control line in accordance with a preferred embodiment of the present invention.
Figure 4:
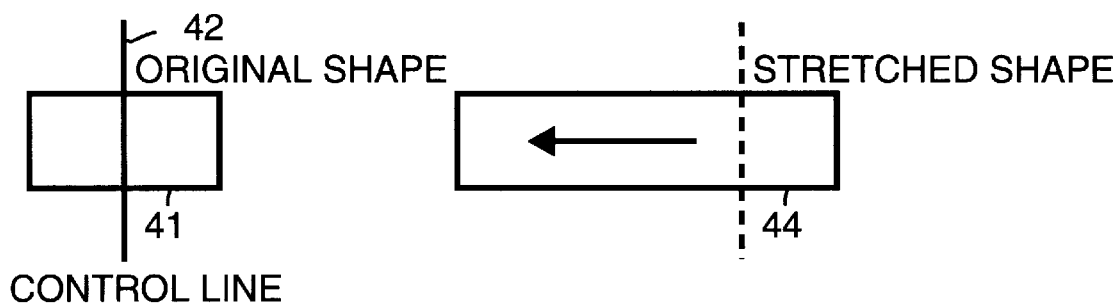
Figure 4:
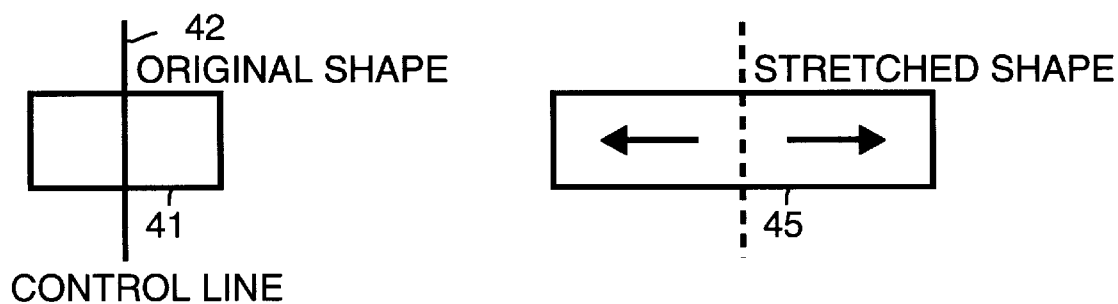

FIG. 4 illustrates stretching of an original shape 41 based on a control line 42. Resulting shape 43 results when original shape 41 is stretched in the positive direction, as indicated by a user in box 33 (shown in FIG. 3). Resulting shape 44 results when original shape 41 is stretched in the negative direction, as indicated by a user in box 33 (shown in FIG. 3). Resulting shape 45 results when original shape 41 is stretched in both the positive direction and the negative direction, as indicated by a user in box 33 (shown in FIG. 3).

Figure 5:
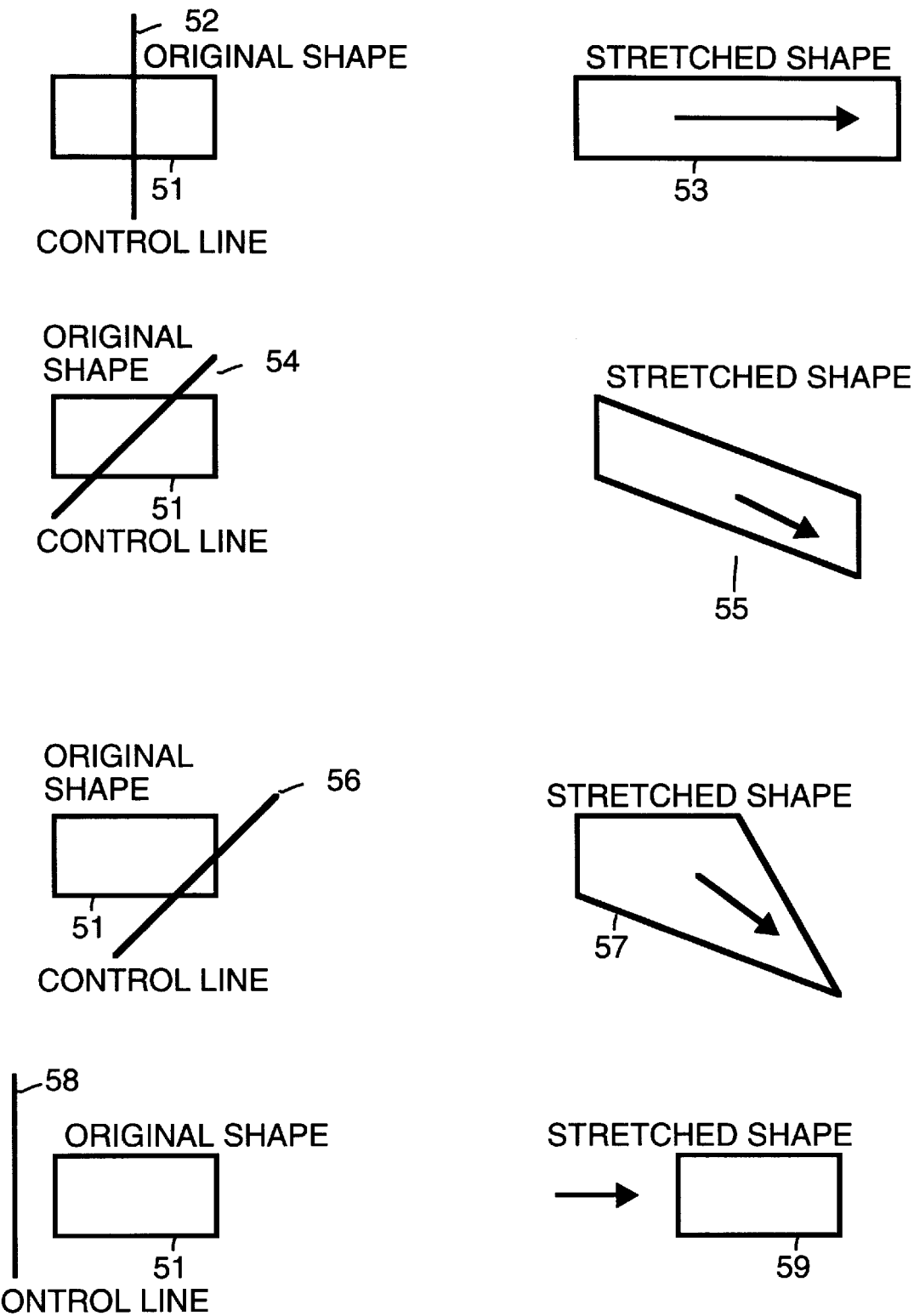
FIG. 5 further illustrates stretching of an original shape based on a control line in accordance with a preferred embodiment of the present invention.

FIG. 5 illustrates stretching of an original shape 51 based on an angle of a control line 52. A resulting shape 53 results when original shape 51 is stretched in the positive direction, as indicated by a user in box 33 (shown in FIG. 3). The stretch is accomplished by moving in an orthogonal direction to control line 52 the two vertices of original shape 51 which are to the right of control line 52.

A resulting shape 55 results when original shape 51 is stretched in the positive direction, as indicated by a user in box 33 (shown in FIG. 3). The stretch is accomplished by moving in an orthogonal direction to a control line 54 the two vertices of original shape 51 which are to the right of control line 54. As illustrated by control line 54, the control line is placed at an arbitrary angle. What is meant by being placed at an arbitrary angle is that the control line does not have to be parallel to or orthogonal to an x-axis, but can be placed at a range of angles from 0 degrees to 180 degrees.

A resulting shape 57 results when original shape 51 is stretched in the positive direction, as indicated by a user in box 33 (shown in FIG. 3). The stretch is accomplished by moving in an orthogonal direction to a control line 56 the one vertex of original shape 51 which is to the right of control line 56. As illustrated by control line 56, the control line is placed at an arbitrary angle. What is meant by being placed at an arbitrary angle is that the control line does not have to be parallel to or orthogonal to an x-axis, but can be placed at a range of angles from 0 degrees to 180 degrees.

A resulting shape 59 results when original shape 51 is stretched in the positive direction, as indicated by a user in box 33 (shown in FIG. 3). The stretch is accomplished by moving in an orthogonal direction to a control line 58 all four vertices of original shape 51 which are to the right of control line 56. In this case, since all vertexes of original shape 51 are to the right of control line 56, the original shape 51 is not actually elongated, but is merely moved in the positive direction.

Figure 6:
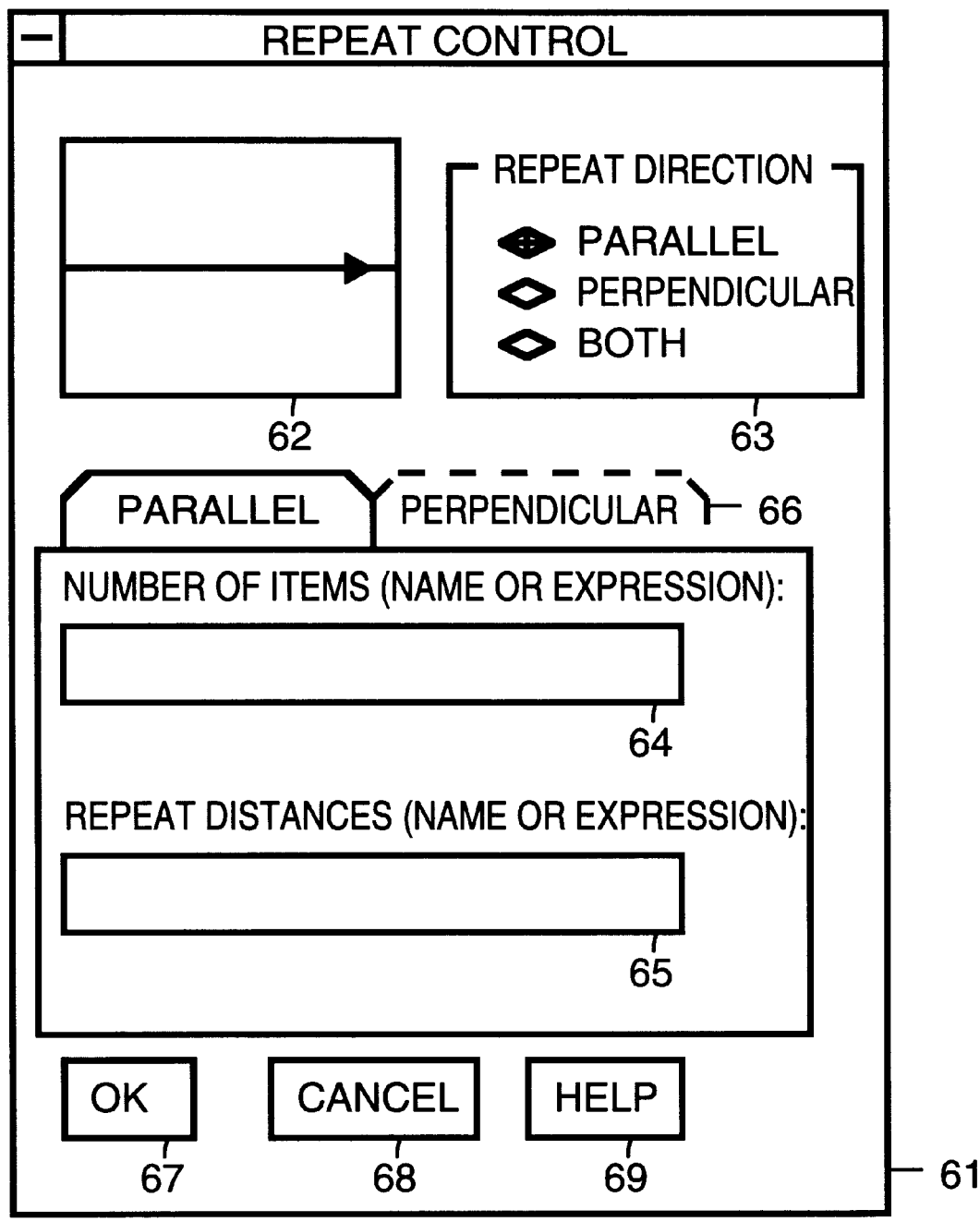
FIG. 6 is a dialog box for a repeat controller in accordance with a preferred embodiment of the present invention.

FIG. 6 shows a dialog box 61 used to receive, from a user, control data 24 used as input to a repeat controller. A user uses a box 63 to indicate whether the repeat direction is to be parallel to the control line, perpendicular to the control line or both parallel and perpendicular with respect to a control line. Box 62 graphically illustrates to a user the orientation of the control line and the direction selected in box 63.

Tabs 66 indicate whether values in a box 64 and a box 65 are to be used for the parallel direction or the perpendicular direction. As shown in FIG. 6, since the parallel table is active, box 64 and a box 65 are used to enter values for the parallel direction. When the perpendicular tab is selected, separate boxes, equivalent to box 64 and box 65, are used to enter values for the perpendicular direction.

In a box 64, a user enters a number of items (i.e., the number of repeated shapes shown in the selected direction). The number of items can be a constant, a variable whose value is supplied by the user at insertion time, or an equation made up of one or more variables and/or constants.

In a box 65, a user enters a repeat distance (i.e., the distance between each repeated item). The repeat can be a constant, a variable whose value is supplied by the user at insertion time, or an equation made up of one or more variables and/or constants.

When a user selects an OK button 67, all the values are entered into the system as control data 24. When the user selects a Cancel button 68, all the information just entered is discarded. A user can request help information by selecting a Help button 69.

Figure 7:
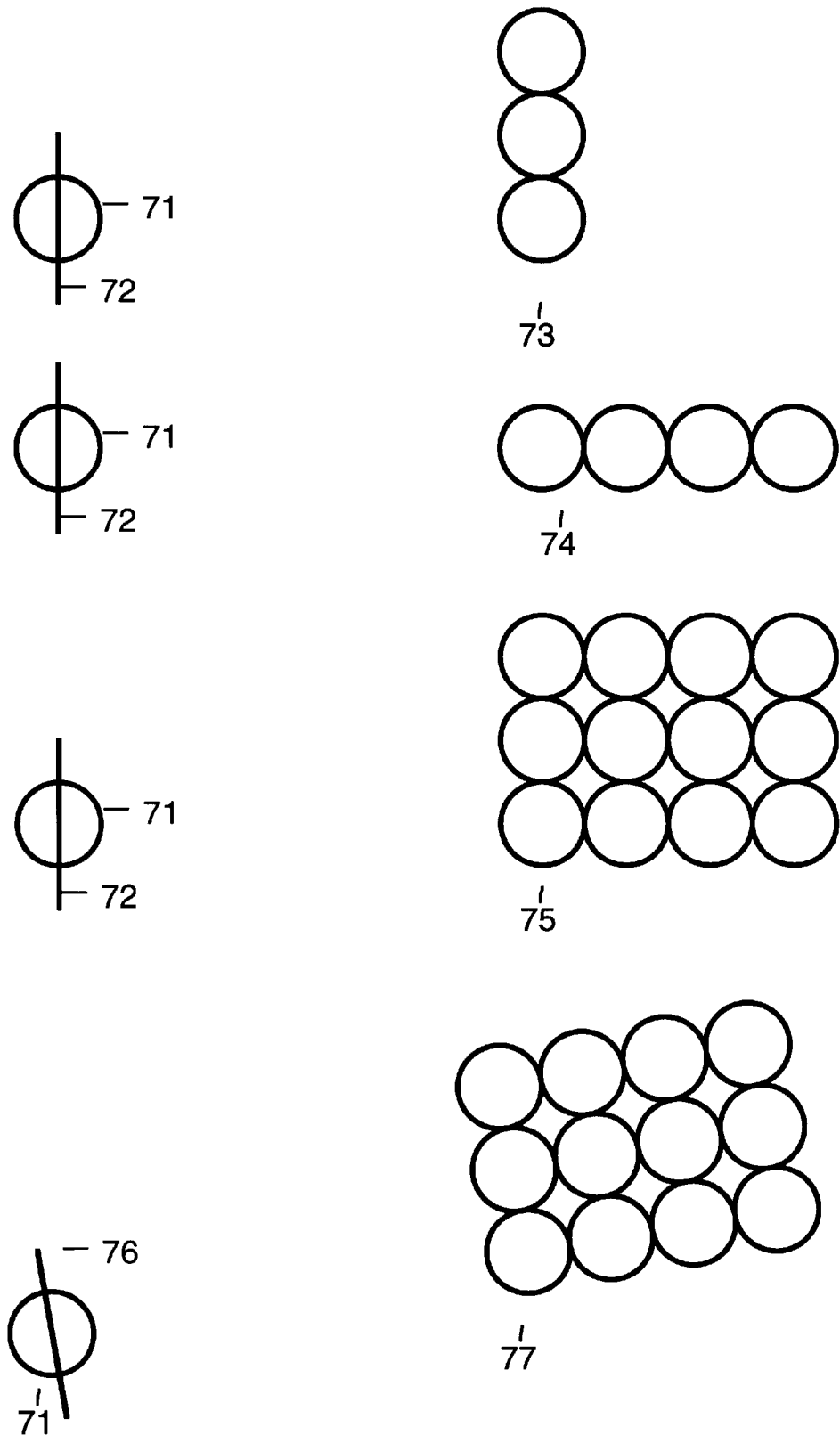
FIG. 7 illustrates repeating of an original shape based on a control line in accordance with a preferred embodiment of the present invention.

FIG. 7 illustrates repeating of an original shape 71 based on a control line 72. Resulting repeated shapes 73 result when original shape 71 is repeated in the parallel direction, as indicated by a user in box 63 (shown in FIG. 6). Resulting repeated shapes 74 results when original shape 71 is repeated in the perpendicular direction, as indicated by a user in box 63 (shown in FIG. 6). Resulting shape 75 results when original shape 71 is repeated in both the parallel direction and the perpendicular direction, as indicated by a user in box 63 (shown in FIG. 6).

Since the repeated shapes are repeated based on the direction of the control line, varying the angle of the control varies the direction at which the repeated shapes are repeated. For example, resulting shape 77 results when original shape 71 is repeated in both the parallel direction and the perpendicular direction with respect to a control line 76.

Figure 8:
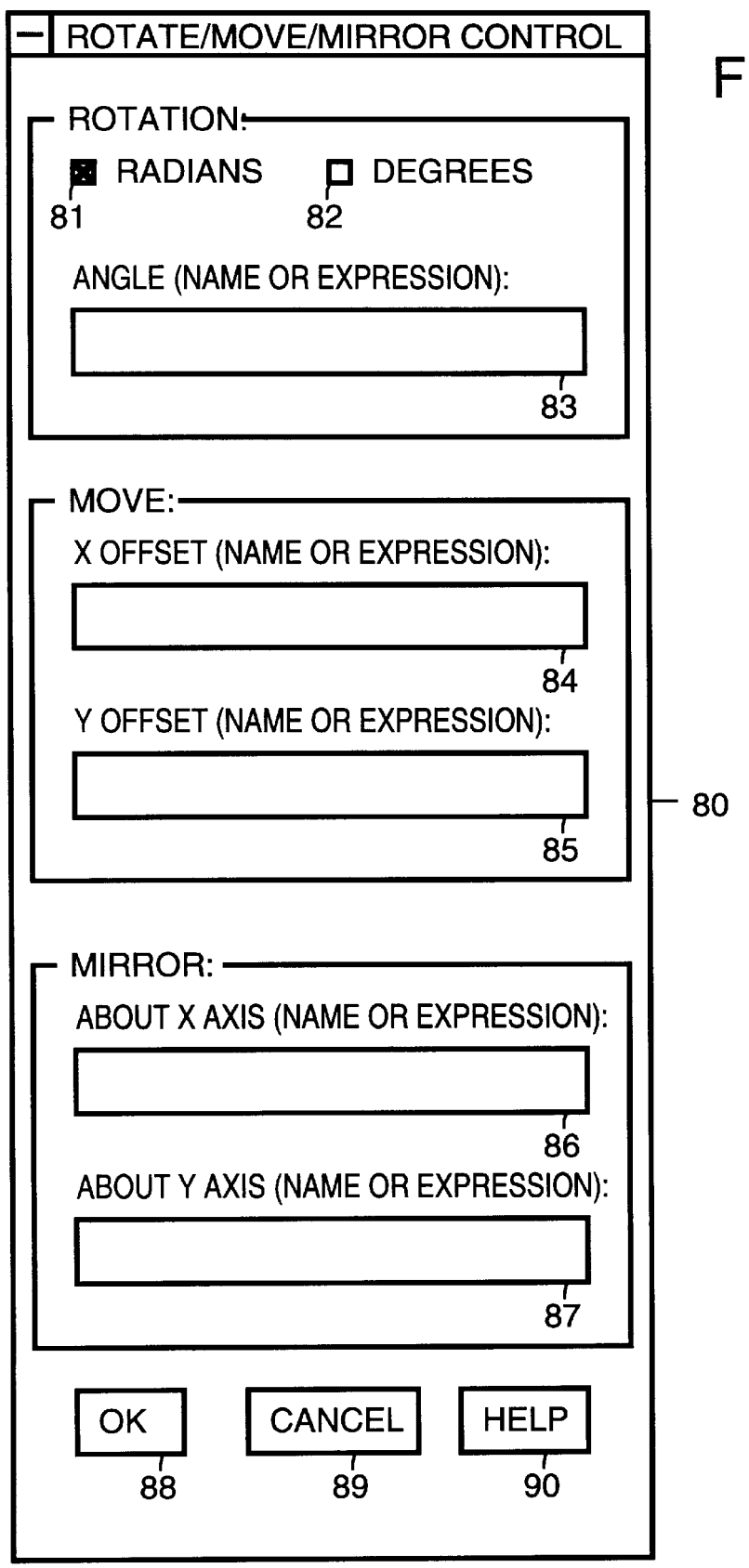
FIG. 8 is a dialog box for a rotate/move/mirror controller in accordance with a preferred embodiment of the present invention.

FIG. 8 shows a dialog box 80 used to receive, from a user, control data 24 used as input to a rotate/move/mirror controller. A user uses a box 81 and a box 82 to indicate whether the rotation angle is set out in radians or degrees. In a box 83, a user enters an angle of rotation. The angle of rotation can be a constant, a variable whose value is supplied by the user at insertion time, or an equation made up of one or more variables and/or constants.

In a box 84, a user enters an x offset for a move. The x offset can be a constant, a variable whose value is supplied by the user at insertion time, or an equation made up of one or more variables and/or constants.

In a box 85, a user enters an y offset for a move. The y offset can be a constant, a variable whose value is supplied by the user at insertion time, or an equation made up of one or more variables and/or constants.

In a box 86, a user enters an indication (True or False) as to whether the original shape is to be mirrored around the x-axis. The indication can be a constant, a variable whose value is supplied by the user at insertion time, or an equation made up of one or more variables and/or constants. For example, if the result is zero, this is taken as an indication of false. Any non-zero result is taken as true.

In a box 87, a user enters an indication (True or False) as to whether the original shape is to be mirrored around the y-axis. The indication can be a constant, a variable whose value is supplied by the user at insertion time, or an equation made up of one or more variables and/or constants.

When a user selects an OK button 88, all the values are entered into the system as control data 24. When the user selects a Cancel button 89, all the information just entered is discarded. A user can request help information by selecting a Help button 90.

Figure 9:
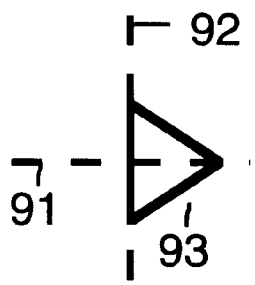
FIG. 9 illustrates rotating of an original shape based on location of the original shape with respect to an x axis and a y axis in accordance with a preferred embodiment of the present invention.
Figure 9:
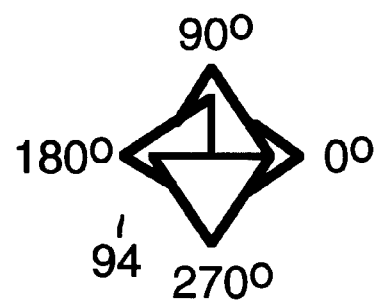
Figure 9:
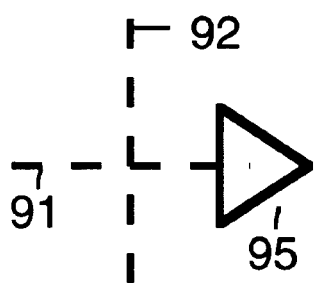
Figure 9:
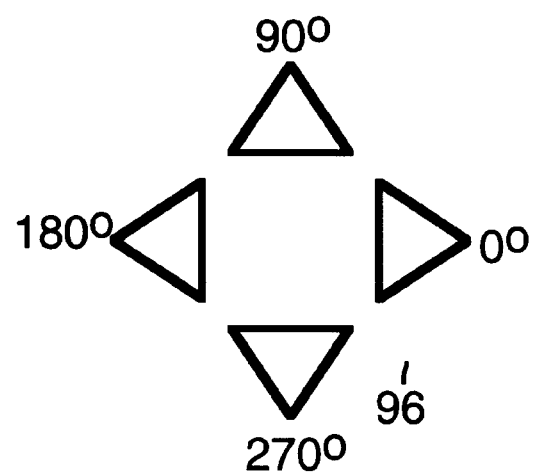

FIG. 9 illustrates rotation of an original shape 93 based on location of original shape 93 with respect to an x axis 91 and a y axis 92. Resulting shapes 94 show resulting locations when original shape 93 is rotated 0°, 90°, 180° and 270°. Resulting shapes 96 show resulting locations when original shape 95, spaced further from y axis 92, is rotated 0°, 90°, 180° and 270°.

Figure 10:
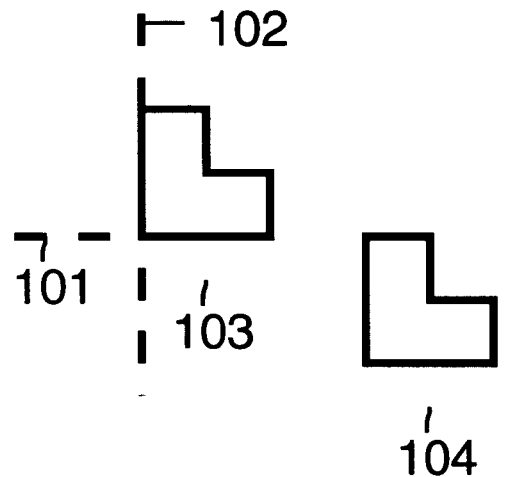
FIG. 10 illustrates movement of an original shape based on location of the original shape with respect to an x axis and a y axis in accordance with a preferred embodiment of the present invention.
Figure 10:
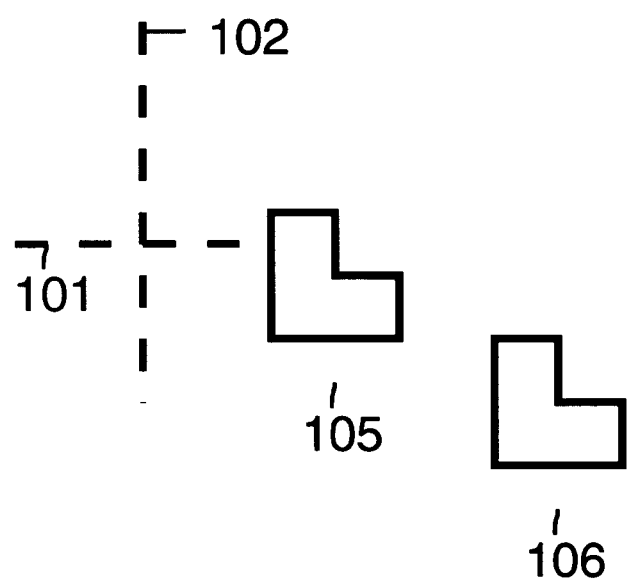

FIG. 10 illustrates movement to a new location for moved shape 104 from the location of an original shape 103. Original shape 103 has a vertex on the intersection of x-axis 101 and y-axis 102. The distances specified in x-offset box 84 and y offset box 85 (shown in FIG. 8) are relative distances not based on the location of the original shape with respect to x-axis 101 and y-axis 102. This is illustrated by the location of moved shape 106 relative to the location of an original shape 105. Original shape 105 is located in a different position relative to x-axis 101 and y-axis 102 as compared to original shape 103. However, the relative distance between moved shape 104 and original shape 103 is the same as the relative distance between moved shape 106 and original shape 105.

Figure 11:
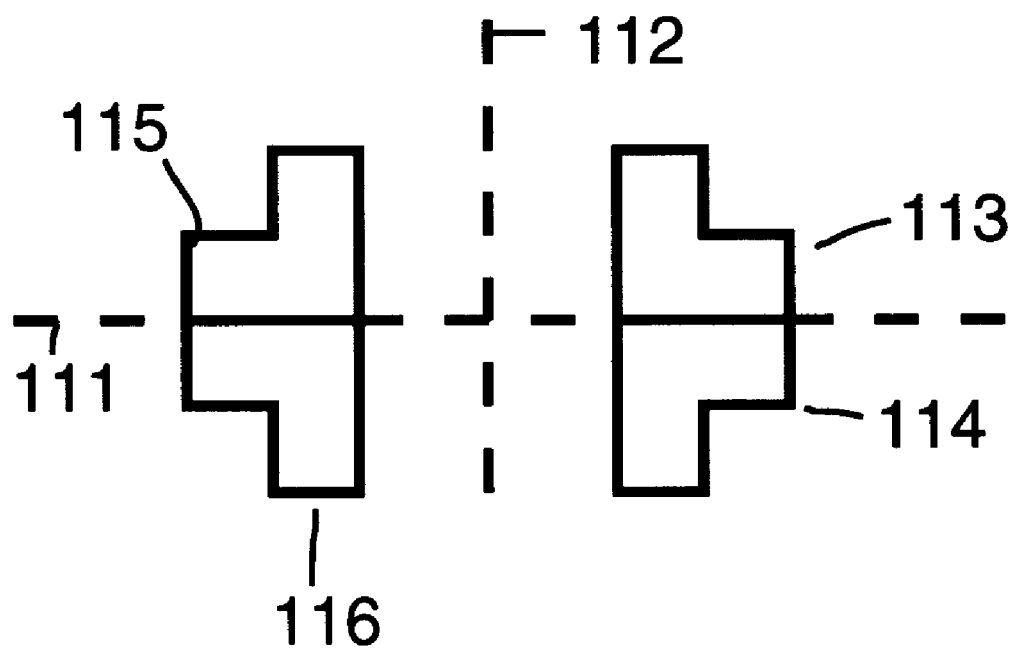
FIG. 11 illustrates mirroring of an original shape based on location of the original shape with respect to an x axis and a y axis in accordance with a preferred embodiment of the present invention.

FIG. 11 illustrates mirroring of an original shape 113 around an x-axis 111 and a y-axis 112. Mirrored shape 114 is the resulting shape when an expression that evaluates to "True" is entered in box 86 and an expression that evaluates to "False" is entered in box 87 (shown in FIG. 8). Mirrored shape 115 is the resulting shape when an expression that evaluates to "False" is entered in box 86 and an expression that evaluates to "True" is entered in box 87 (shown in FIG. 8). Mirrored shape 116 is the resulting shape when an expression that evaluates to "True" is entered in box 86 and an expression that evaluates to "True" is entered in box 87 (shown in FIG. 8).

The rotate/move/mirror controls can be performed on shapes before or after use of other controls. The order of performance has an effect on the final outcome.

Figure 12:
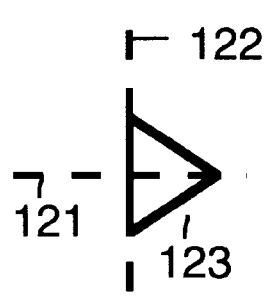
FIG. 12 illustrates the effect of operation order when a shape is repeated and rotated in accordance with a preferred embodiment of the present invention.
Figure 12:
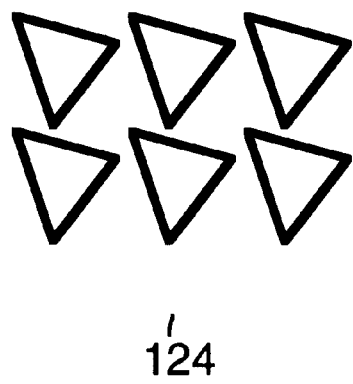
Figure 12:
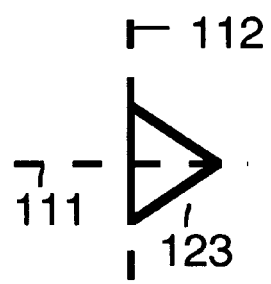
Figure 12:
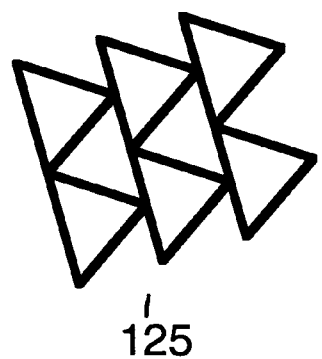

For example, FIG. 12 illustrates the effect of operation order when a shape is repeated and rotated. Shapes 124 illustrate what happens when an original shape 123, shown situated on an x-axis 121 and a y axis 122, is first rotated and then repeated. Shapes 125 illustrates what happens when original shape 123 is first repeated and then rotated.

Figure 13:
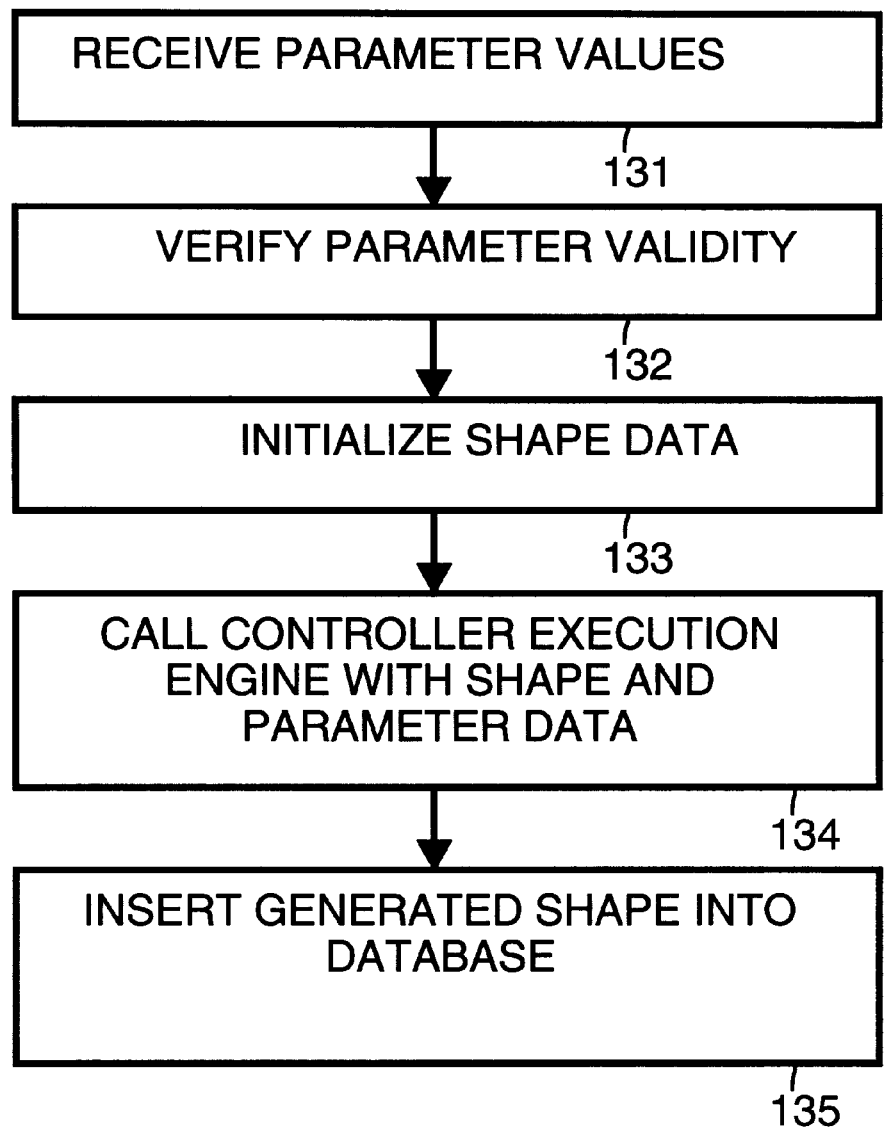
FIG. 13 is a flowchart which summarizes operation of a controller in accordance with a preferred embodiment of the present invention.
Figure 14:
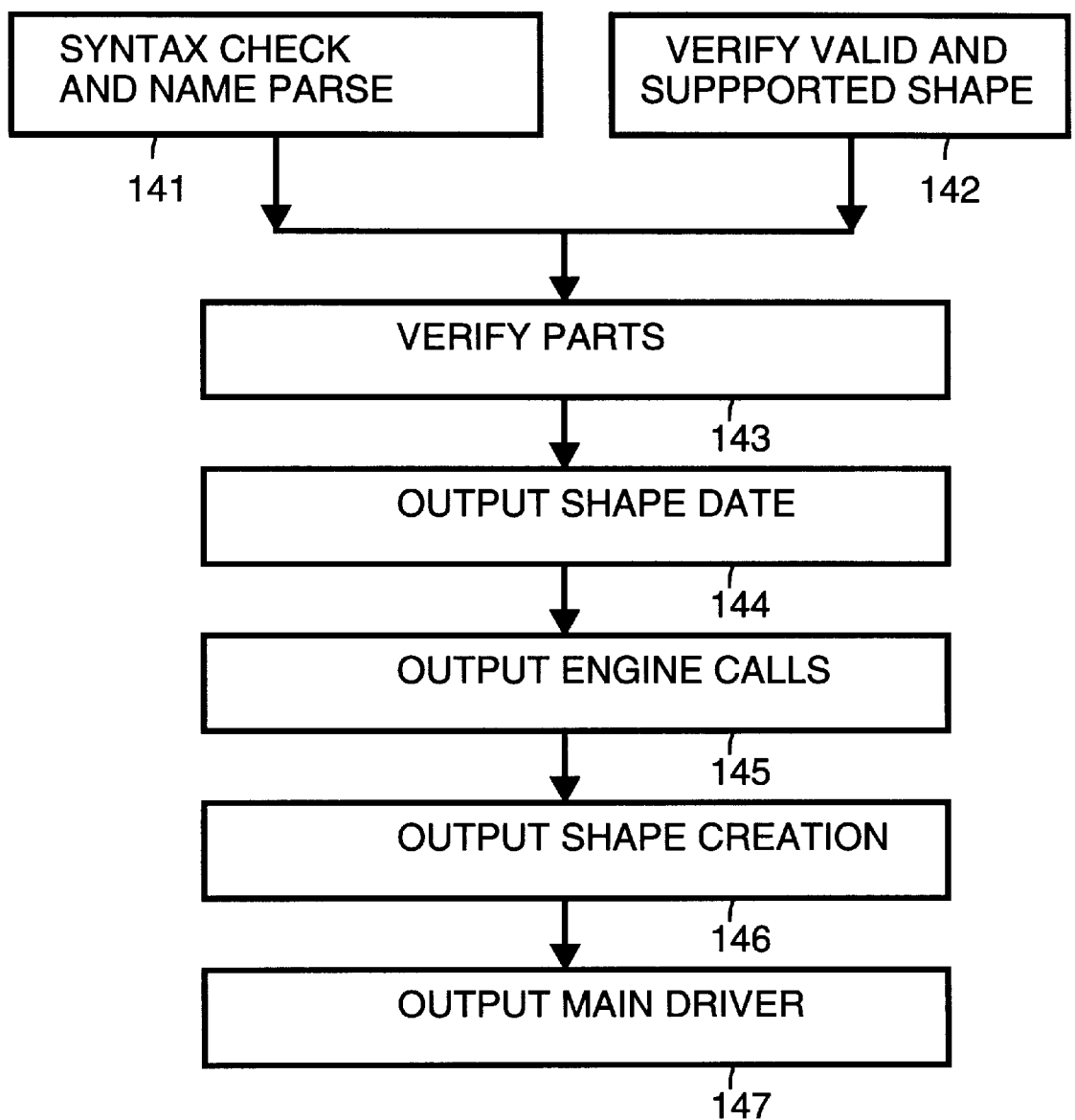
FIG. 14 is a flowchart which describes generation of a graphics language macro in accordance with a preferred embodiment of the present invention.

FIG. 13 summarizes operation of a controller such as the stretch controller, the repeat controller and the rotate/move/mirror controller described above. In a step 131, parameters are received from a user. In a step 132, validity of the parameters is verified. In a step 133, the graphic shape data is initialized. In a step 134, the parameters are prepared and the controller execution engine is called. The controller execution engine is called with the data for the source layout and all other controller parameters. In a step 135, the generated shape is inserted into a database.

An example of code which passes to the controller execution engine the single shape or list of shapes for creation in the layout is set out in Table 1 below:

TABLE 1

```
pam_set_cline_info(
    PAM_LINE_X1,        0,
    PAM_LINE_Y1,        -0.001809496,
    PAM_LINE_X2,        0,
    PAM_LINE_Y2,        0.001809496,
    PAM_LINE_DX,        0,
    PAM_LINE_DY,        1,
    PAM_LINE_SLOPE,     9000000000);
decl p_value1X_3 = number;
decl p_value2X_3 = width+space;
decl p_value1Y_3 = 0.0;
decl p_value2Y_3 = 0.0;
pam_rep = pam_do_repeat(
    PAM_COMMON_DATA,        p_414A2788,
    PAM_REPEAT_DIRECTION,   1,
    PAM_REPEAT_MODEX,       3,
    PAM_REPEAT_VALUE1X,     p_value1X_3,
    PAM_REPEAT_VALUE2X,     p_value2X_3,
    PAM_REPEAT_MODEY,       3,
    PAM_REPEAT_VALUE1Y,     p_value1Y_3,
    PAM_REPEAT_VALUE2Y,     p_value2Y_3);
l_414A2788 = append(l_414A2788, pam_rep);
if (is_list(l_414A2788))
    depam_output_polygon_list(l_414A2788);
else
    depam_output_polygon(p_414A2788);
```

Table 1 sets out code used particularly for the repeater controller. The stretch controller and the rotate/move/mirror controller will look very similar except that the stretch controller and the rotate/move/mirror controller do not generate a list of shapes so there would be no append( ) call after the call to the specific controller. Additionally, the rotate/move/mirror controller does not use a control line so the rotate/move/mirror controller does not include a pam_set_cline_info( ) call.

Table 2 below sets out code that implements the stretch controller execution engine (pam_do_stretch( )) as the stretch controller execution engine is used when called from code similar to the code set out in Table 1 above.

All the parameters for the reference control line, the stretch control, and the graphical shape being operated on are passed in.

TABLE 2

```
void perform_stretch(
    int stretchType,
    double x1,
    double y1,
    double x2,
    double y2,
    double dx,
    double dy,
    double length,
    double offset,
    PamPointT *init,
    PamPointT *data,
    int n)
/* Declare the required local variables.*/
{
double pdx, pdy;
double slope;
double b, t;
int i;
/* Determine if the construction line is basically vertical or
horizontal and compute the X or Y intercept as appropriate.
Also calculate the dx and dy vectors for use in stretching
points. */
```

TABLE 2-continued

```
if(fabs(dx) >= fabs(dy)){  /*   |  /     For cLines that  */
                           /*  |/##      are 'close' to   */
    pdy = dx;              /* ---+---    the X axis.      */
    pdx = -dy;             /*  |\##                       */
    if (dx != 0)           /*   | \      y = mx + b       */
        slope = dy/dx;
    else
        slope = 9e9;
    b = y1 - slope * x1;
}
else/* dx < dy */{         /*\##|##/     For cLines that  */
    pdx = dy;              /*  \|/       are 'close' to   */
    pdy = -dx;             /*---+---     the Y axis.      */
    if (dy != 0)           /*   |                         */
        slope = dx/dy;     /*   |        x = my + b       */
    else
        slope = 9e9;
    b = x1 - slope * y1;
}
/* If the stretch is to BOTH sides of the control line, then only
half the requested amounts will be used for each side. */
if(stretchType == PAM_STRETCH_BOTH) {
    length /= 2.0;
    offset /= 2.0;
}
/* Using the above information, calculate the actual stretch
vectors. */
length -= offset;
pdx *= length;
pdy *= length;
```

Table 3 below handles the cases to determine if a given vertex point is on the side of the control line to be stretched (moved by the above vector amounts) and which way that movement will take place so as to be "away" from the control line.

TABLE 3

```
for (i=0; i<n i++) {
    if(fabs(dx) >= fabs(dy)) {
        t = slope * init[i].x + b;
        if(init[i].y > t && (stretchType ==
PAM_STRETCH_POSITIVE ||
                    stretchType ==
PAM_STRETCH_BOTH)) {
            data[i].x += pdx;
            data[i].y += pdy;
        }
        if(init[i].y < t && (stretchType ==
PAM_STRETCH_NEGATIVE ||
                    stretchType ==
PAM_STRETCH_BOTH)) {
            data[i].x -= pdx;
            data[i].y -= pdy;
        }
    }
    else {
        t = slope * init[i].y + b;
        if(init[i].x > t && (stretchType ==
PAM_STRETCH_POSITIVE ||
                    stretchType ==
PAM_STRETCH_BOTH)) {
            data[i].x += pdx;
            data[i].y += pdy;
        }
        if(init[i].x < t && (stretchType ==
PAM_STRETCH_NEGATIVE ||
                    stretchType ==
PAM_STRETCH_BOTH)) {
            data[i].x -= pdx;
            data[i].y -= pdy;
        }
    }
}
/* Verify that the data has not exceeded the internal database
resolution. */
```

TABLE 3-continued

```
            check_for_overflow(data[i].x);
            check_for_overflow(data[i].y);
        }
    }
```

TABLE 4

```
ValueT perform_repeat(
        int repeatType,
        double x1,
        double y1,
        double x2,
        double y2,
        double dx,
        double dy,
        int modeX,
        double value1X,
        double value2X,
        int modeY,
        double value1Y,
        double value2Y,
        PamPointT *data,
        int n
        )
/* Declare the required local variables.*/
{
double pdx, pdy;
int x, y;
int i, j, k;
double stepX, stepY;
long dim, *dimInfo;
ValueT arrayP;
PamPointT *tmp;
ValueT retVal;
/* Calculate the copy distance vector depending on if the
construction line is basically horizontal or vertical. */
if(fabs(dx) >=           /*   | /       For cLines that  */
fabs(dy)) {
        pdy = dx;        /*   |/##      are 'close' to   */
        pdx = -dy;       /*---+---      the X axis.      */
                         /*   |/##                       */
        }                /*   | \       y = mx + b       */
else /* dx < dy */{      /*   \##|##/   For cLines that  */
        pdx = dy;        /*    \|/      are 'close' to   */
        pdy = -dx;       /*   ---+---   the Y axis.      */
                         /*    |                         */
                         /*    |                         */
        }                /*    |        x = my + b       */
/* Assign the local variables with values depending on the type
of
repeat being done: parallel to the construction line (in X),
perpendicular to the construction line (in Y), or both (in XY). */
switch (repeatType) {
        case PAM_REPEAT_X:
            x = (int)value1X;
            y = 1;
            stepX = value2X;
            stepY = 0.0;
            break;
        case PAM_REPEAT_Y:
            x = 1;
            y = (int)value1Y;
            stepX = 0.0;
            stepY = value2Y;
            break;
        case PAM_REPEAT_XY:
            x = (int)value1X;
            y = (int)value1Y;
            stepX = value2X;
            stepY = value2Y;
            break;
        default:
            ERROR("undefined type");
        }
/* If either repeat count is zero, there is nothing to do, return.
*/
if(x * y == 0)                      /* nothing to repeat */
        return(NULL_VALUE);
/*Perform a test to make sure the repeat count does not exceed
a user-setable limit. This traps bad user data that could result
in long or infinite copy operations due to user errors. */
if(x > CopyLimit || y > CopyLimit || x*y > CopyLimit) }/*
                                                  limit error */
        if (!DisplayedError)
            aerr_process_error(APAM_ERR
            (APAM_WARN_REPEAT_MAX
        ),
                                    "CELL_COMPILER_MAX_COPY
        = %d", CopyLimit);
            DisplayedError = TRUE;
            return(NULL_VALUE);
        }
/*Prepare the dynamically created list to receive the copies. */
retVal = aval_create_list(x * y);
dim = 2;
dimInfo = aval_create_limits(dim, 0, n-1, 0, 1);
/* Interate over the requested copy counts for both axis. */
for (i=0; i<x; i++) {
        for (j=0; j<y;j++) {
        /* Create a new entry and fill it with the basic shape's date. */
                arrayP = aval_create_array(AvalReal, dim,
dimInfo,
                                        (void*)data);
                if (j * x + i >= aval_list_length(retVal))
                        ERROR("exceeded list size");
                aval_put_list_item(retVal, j * x + i, arrayP);
                tmp = (PamPointT
*)aval_get_array_data(arrayP);
        /* Iterate over the vertex points and modify each of them to
        place this copy in the correct location. */
                for (k=0; k<n; k++) {
                        tmp[k].x += (double)i * dx * stepX +
                                    (double)j * pdx * stepY;
                        tmp[k].y += (double)j * pdy * stepY +
                                    (double)i * dy * stepX:
        /* Verify that the data has not exceeded the internal database
        resolution. */
                        check_for_overflow(tmp[k].x);
                        check_for_overflow(tmp[k].y);
                        }
                }
        }
return(retVal);
}
```

TABLE 5

```
void perform_flip(
        double offsetX,
        double offsetY,
        double flipX,
        double flipY,
        double angle,
        PamPointT *data,
        int n)
/* Declare and initialize the required local variables. */
{
double rsin, rcos;
double tx, ty;
int i;
rsin = sin(angle);
rcos = cos(angle);
/* Iterate thru each data point of the shape. */
for (i=0; i<n; i++) {
        tx = data[i].x;
        ty = data[i].y;
        /* Perform the Rotation and Move parts of the control. */
        data[i].x = tx * rcos - ty * rsin + offsetX;
        data[i].y = tx * rsin + ty * rcos + offsetY;
        /* Verify that the data has not exceeded the internal
        database resolution. */
        check_for_overflow(data[i].x);
        check_for_overflow(data[i].y);
```

TABLE 5-continued

```
/* Perform the Flip part of the control. */
    if (flipX)
        data[i].y = -data[i].y;
    if (flipY)
        data[i].x = -data[i].x;
    }
}
```

GOTTEXT

I claim:

1. A computer implemented method for stretching a graphic shape comprising the following steps:
   (a) receiving from a user a stretch distance;
   (b) receiving from the user a stretch direction; and
   (c) when in step (b) the stretch direction is positive, performing the following substeps:
      (c.1) determining which vertices of the graphic shape are on a first side of a control line, wherein the control line is at an arbitrary angle, and
      (c.2) moving the vertices of the graphic shape, which are on the first side of the control line, the stretch distance in a direction orthogonal to the control line.

2. A computer implemented method as in claim 1 additionally comprising the following step:
   (d) when in step (b) the stretch direction is negative, performing the following substeps:
      (d.1) determining which vertices of the graphic shape are on a second side of the control line, and
      (d.2) moving the vertices of the graphic shape, which are on the second side of the control line, the stretch distance in a direction orthogonal and away from the control line.

3. A computer implemented method as in claim 2 additionally comprising the following step:
   (e) when in step (b) the stretch direction is both positive and negative, performing the following substeps:
      (e.1) moving the vertices of the graphic shape, which are on the first side of the control line, one half the stretch distance in the direction orthogonal to the control line, and
      (e.2) moving the vertices of the graphic shape, which are on the second side of the control line, one half the stretch distance in the direction orthogonal and away from the control line.

4. A computer implemented method as in claim 1 wherein when in substep (c.1) all vertices of the graphic shape are on the first side of the control line, then in substep (c.2) all the vertices of the graphic shape are moved the stretch distance in the direction orthogonal to the control line.

5. A computer implemented method for stretching a graphic shape comprising the following steps:
   (a) receiving from a user a stretch distance;
   (b) determining which vertices of the graphic shape are on a first side of a control line, wherein the control line is at an arbitrary angle; and,
   (c) moving the vertices of the graphic shape, which are on the first side of the control line, the stretch distance in a direction orthogonal to the control line.

6. A computer implemented method for repeating a graphic shape comprising the following steps:
   (a) receiving from a user a number of repeated shapes to be generated;
   (b) receiving from the user a repeat direction; and,
   (c) when in step (b) the repeat direction is parallel, performing the following substep:
      (c.1) generating the repeated shapes in a direction parallel to a control line, wherein the control line is at an arbitrary angle.

7. A computer implemented method as in claim 6 additionally comprising the following step:
   (d) when in step (b) the repeat direction is perpendicular, performing the following substep:
      (d.1) generating the repeated shapes in a direction perpendicular to the control line.

8. A computer implemented method as in claim 7 additionally comprising the following step:
   (e) when in step (b) the repeat direction is both parallel and perpendicular, performing the following substep:
      (e.1) generating the repeated shapes in a direction perpendicular to the control line and in a direction parallel to the control line.

9. A computer implemented method as in claim 6 additionally comprising the following steps:
   (d) receiving from the user a repeat distance which specifies a repeat distance between repeated shapes in the direction parallel to the control line; and,
   (e) receiving from the user a repeat distance which specifies a repeat distance between repeated shapes in the direction perpendicular to the control line.

10. A stretch controller for stretching a graphic shape, comprising:
    an interface for receiving from a user a stretch distance and a stretch direction; and,
    a stretch controller engine for, when the stretch direction is positive, determining which vertices of the graphic shape are on a first side of a control line, and moving the vertices of the graphic shape, which are on the first side of the control line, the stretch distance in a direction orthogonal to the control line;
    wherein the control line is at an arbitrary angle.

11. A stretch controller as in claim 10, wherein the stretch controller engine is additionally for, when the stretch direction is negative, determining which vertices of the graphic shape are on a second side of the control line, and moving the vertices of the graphic shape, which are on the second side of the control line, the stretch distance in a direction orthogonal and away from the control line.

12. A stretch controller as in claim 11, wherein the stretch controller engine is additionally for, when the stretch direction is both positive and negative, moving the vertices of the graphic shape, which are on the first side of the control line, one half the stretch distance in the direction orthogonal to the control line, and moving the vertices of the graphic shape, which are on the second side of the control line, one half the stretch distance in the direction orthogonal and away from the control line.

13. A stretch controller as in claim 10 wherein when all vertices of the graphic shape are on the first side of the control line, the stretch controller engine moves all the vertices of the graphic shape the stretch distance in the direction orthogonal to the control line.

14. A stretch controller for stretching a graphic shape, comprising:
    an interface for receiving from a user a stretch distance; and,
    a stretch controller engine for determining which vertices of the graphic shape are on a first side of a control line, and moving the vertices of the graphic shape, which are on the first side of the control line, the stretch distance in a direction orthogonal to the control line;
    wherein the control line is at an arbitrary angle.

15. A repeat controller for repeating a graphic shape, comprising:
- an interface for receiving from a user a number of repeated shapes to be generated and for receiving from the user a repeat direction; and;
- repeat controller engine for, when the repeat direction is parallel, generating the repeated shapes in a direction parallel to a control line;;
- wherein the control line is at an arbitrary angle.

16. A repeat controller as in claim 15, wherein the repeat controller engine is for, when the repeat direction is perpendicular, generating the repeated shapes in a direction perpendicular to the control line.

17. A repeat controller as in claim 16, wherein the repeat controller engine is for, when the repeat direction is both parallel and perpendicular, generating the repeated shapes in a direction perpendicular to the control line and in a direction parallel to the control line.

18. A repeat controller as in claim 15 wherein the interface is additionally for receiving from the user a repeat distance which specifies a repeat distance between repeated shapes in the direction parallel to the control line, and for receiving from the user a repeat distance which specifies a repeat distance between repeated shapes in the direction perpendicular to the control line.

19. Storage media for storing software which, when executed, performs a method for stretching a graphic shape comprising the following steps:
- (a) receiving from a user a stretch distance;
- (b) receiving from the user a stretch direction; and
- (c) when in step (b) the stretch direction is positive, performing the following substeps:
  - (c.1) determining which vertices of the graphic shape are on a first side of a control line, wherein the control line is at an arbitrary angle, and
  - (c.2) moving the vertices of the graphic shape, which are on the first side of the control line, the stretch distance in a direction orthogonal to the control line.

20. Storage media as in claim 19, wherein the method additionally comprises the following step:
- (d) when in step (b) the stretch direction is negative, performing the following substeps:
  - (d.1) determining which vertices of the graphic shape are on a second side of the control line, and
  - (d.2) moving the vertices of the graphic shape, which are on the second side of the control line, the stretch distance in a direction orthogonal and away from the control line.

21. Storage media as in claim 20, wherein the method additionally comprises the following step:
- (e) when in step (b) the stretch direction is both positive and negative, performing the following substeps:
  - (e.1) moving the vertices of the graphic shape, which are on the first side of the control line, one half the stretch distance in the direction orthogonal to the control line, and
  - (e.2) moving the vertices of the graphic shape, which are on the second side of the control line, one half the stretch distance in the direction orthogonal and away from the control line.

22. Storage media as in claim 19 wherein when in substep (c.1) all vertices of the graphic shape are on the first side of the control line, then in substep (c.2) all the vertices of the graphic shape are moved the stretch distance in the direction orthogonal to the control line.

23. Storage media for storing software which, when executed, performs a method for repeating a graphic shape comprising the following steps:
- (a) receiving from a user a number of repeated shapes to be generated;
- (b) receiving from the user a repeat direction; and,
- (c) when in step (b) the repeat direction is parallel, performing the following substep:
  - (c.1) generating the repeated shapes in a direction parallel to a control line, wherein the control line is at an arbitrary angle.

24. Storage media as in claim 23, wherein the method additionally comprises the following step:
- (e) when in step (b) the repeat direction is both parallel and perpendicular, performing the following substep:
  - (e.1) generating the repeated shapes in a direction perpendicular to the control line and in a direction parallel to the control line.

25. Storage media as in claim 23, wherein the method additionally comprises the following steps:
- (d) receiving from the user a repeat distance which specifies a repeat distance between repeated shapes in the direction parallel to the control line; and,
- (e) receiving from the user a repeat distance which specifies a repeat distance between repeated shapes in the direction perpendicular to the control line.

* * * * *